(12) United States Patent
Roosen et al.

(10) Patent No.: US 6,655,001 B1
(45) Date of Patent: Dec. 2, 2003

(54) PROCESS FOR A DIAPHRAGM FOR ELECTROACOUSTIC TRANSDUCERS

(75) Inventors: Dirk Roosen, Buettelborn (DE); Leonhard Maier, Nieder-Roden (DE); Hermann Seibert, Kaiserslautern (DE)

(73) Assignee: Roehm GmbH & Co., KG, Darmstadt (DE)

(*) Notice: Subject to any disclaimer, the term of this patent is extended or adjusted under 35 U.S.C. 154(b) by 0 days.

(21) Appl. No.: 09/926,706

(22) PCT Filed: May 24, 2000

(86) PCT No.: PCT/EP00/04703

§ 371 (c)(1),
(2), (4) Date: Feb. 12, 2002

(87) PCT Pub. No.: WO00/76269

PCT Pub. Date: Dec. 14, 2000

(30) Foreign Application Priority Data

Jun. 5, 1999 (DE) .......................... 199 25 787

(51) Int. Cl.[7] .............................................. H04R 31/00
(52) U.S. Cl. .......................... 29/594; 29/25.35; 29/830; 310/324
(58) Field of Search ................... 29/25.35, 830, 29/594; 310/324; 264/272.16, 257, 258, 319, 324

(56) References Cited

U.S. PATENT DOCUMENTS

| 4,291,781 A | * | 9/1981 | Niguchi et al. ............. 162/104 |
| 4,517,416 A | * | 5/1985 | Goossens ..................... 181/144 |
| 4,670,074 A | * | 6/1987 | Broussoux et al. ......... 156/198 |
| 5,163,209 A | * | 11/1992 | Harada et al. ............. 29/25.35 |
| 5,668,886 A | * | 9/1997 | Sakamoto et al. .......... 381/398 |
| 6,097,829 A | * | 8/2000 | Guenther et al. ........... 181/169 |
| 6,219,432 B1 | * | 4/2001 | Fryer et al. ................. 181/171 |

* cited by examiner

Primary Examiner—A. Dexter Tugbang
Assistant Examiner—Tai Nguyen
(74) Attorney, Agent, or Firm—Oblon, Spivak, McClelland, Maier & Neustadt, P.C.

(57) ABSTRACT

A diaphragm for an electroacoustic transducer has a) a core layer containing poly(meth)acrylimide foam and b) at least one cover layer. The diaphragm is produced by laminating the cover layer with the core layer, using a pressure of 0.4 MPa and a temperature of 160° C., whereby at least the side of the core layer which comes into contact with the cover layer is compressed. The resultant composite is subsequently cooled to a temperature below 80° C., before the pressure is reduced to the ambient pressure. The process can be carried out as a single-step process. The diaphragms produced by this process demonstrate an excellent stability, whereby the cover layers in particular are highly resistant to separation.

7 Claims, 1 Drawing Sheet

PROCESS FOR A DIAPHRAGM FOR ELECTROACOUSTIC TRANSDUCERS

Figure 1:
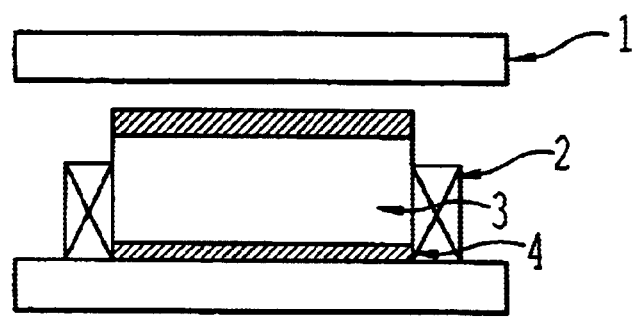

The present invention relates to a process for producing membranes for electroacoustic transducers, which comprise a core layer comprising poly(meth)acrylimide foam and at least one covering layer, and to diaphragms for electroacoustic transducers.

Electroacoustic transducers or loudspeakers are devices which are able to convert electric alternating currents in the sound frequency range into audible sound. These devices are widely known in the prior art and are described, for example, in U.S. Pat. No. 4,928,312, DE-A 30 36 876 and DE-A 22 25 710.

The production of these loudspeakers requires diaphragms which have to meet numerous conditions. Thus, the weight of the diaphragm should be as low as possible, while its strength should meet relatively high requirements so that the diaphragms behave as completely stiff cylinders even at high frequencies.

Thus, for example, EP-A-0 087 177 describes a diaphragm which comprises a layer of poly(meth)acrylimide foam. In this document, it is stated that the poly(meth)acrylimide-containing layer can be provided with a covering layer. This covering layer is applied at room temperature by means of adhesive to ensure that the density of the core layer remains as low as possible. According to EP-A-0 087 277, the product of density and modulus of elasticity should be as small as possible, since this factor is a measure of the quality of the diaphragm.

The European patent application EP-A-0 126 841 discloses a loudspeaker diaphragm comprising two paper layers which are joined to one another over their entire area by an intermediate layer of plastic. The sandwich structure is produced by placing a foamed thermoplastic between the paper layers and compressing this composite between heated press platens until the plastic intermediate layer has a thickness which is from about 1 to 2 times the thickness of one of the paper layers.

Loudspeaker diaphragms can be provided with covering layers for many reasons. These include, inter alia, increasing the strength of the diaphragm, or aesthetic reasons. However, the process proposed in EP-A-0 087 177 for producing diaphragms for acoustic transducers which comprise a core layer comprising poly(meth)acrylimide foam and at least one covering layer is complicated since it is a two-stage process. Furthermore, it is suitable only for covering layers which have a fibrous structure, since volatilization of solvent from the composite of core layer and covering layer is only ensured by these.

Furthermore, it has been found that the decoration films easily become detached from the core layer on prolonged use if they have been applied to a particularly smooth poly(meth)acrylimide layer. Here, it has to be remembered that although the membrane should be configured as a stiff cylinder, this aim can be achieved only incompletely and vibrations and deformations within the membrane are unavoidable. These vibrations can lead to detachment occurring over a prolonged period of time.

In view of the prior art reported and discussed here, it is an object of the present invention to provide a process for producing diaphragms for electroacoustic transducers which comprise a core layer comprising poly(meth)acrylimide foam and at least one covering layer. This process should be very simple to carry out.

A further object of the invention is to provide a process for producing a diaphragm for electroacoustic transducers in which particularly short cycle times can be achieved.

A further object of the invention is to provide diaphragms for electroacoustic transducers which comprise a core layer comprising poly(meth)acrylimide foam and at least one covering layer, in which diaphragms the abovementioned detachment problems of the covering layer are reduced or eliminated.

These objects and further objects which are not explicitly mentioned but can be derived in a self-evident manner from the relationships discussed here or necessarily follow therefrom are achieved by a process for producing a diaphragm for electroacoustic transducers which comprise a core layer comprising a poly(meth)acrylimide foam and at least one covering layer and have all the features of the independent process claim 1.

Advantageous embodiments of the process of the invention are claimed in the subordinate claims dependent on claim 1. In respect of the diaphragm for electroacoustic transducers, the subject matter of claim 8 provides a solution to the object of the invention.

A process for producing a diaphragm for electroacoustic transducers which comprises a core layer comprising poly(meth)acrylimide foam and at least one covering layer, by means of which the covering layer is applied particularly firmly to the core layer, comprises laminating the covering layer with the core layer under a pressure of $\geq 0.4$ MPa at a temperature of $\geq 160°$ C., at the same time compacting at least the side of the core layer which is in contact with the covering layer and subsequently cooling the resulting composite to a temperature below $80°$ C. before reducing the pressure to ambient pressure.

Secondly, a diaphragm for electroacoustic transducers which comprises a core layer comprising poly(meth)acrylimide foam and at least one covering layer and has a peel strength of $\geq 10$ Nmm/mm, a modulus of elasticity of $\geq 50$ MPa and a flexural strength of $\geq 2$ MPa provides a diaphragm whose covering layer does not become detached from the core layer even after prolonged use.

The following advantages, in particular, are achieved by the measures according to the invention:

Combination of compaction and lamination in one process step.

The process of the invention makes very short cycle times possible.

The covering layer is applied particularly firmly to the core layer by means of the process of the invention.

In the process of the invention, it is also possible to use covering layers which do not have a fibrous structure.

A desired strength of the component can be set within a wide range via the degree of compaction of the core layer in combination with selection of the covering layer.

The process of the invention is characterized in that the covering layer is laminated with the core layer under a pressure of $\geq 0.4$ MPa at a temperature of $\geq 160°$ C., at the same time compacting at least the side of the core layer which is in contact with the covering layer is compacted and the resulting composite is subsequently cooled to a temperature below $80°$ C. before the pressure is reduced to ambient pressure. This can generally be achieved by hot pressing. These methods are widely known in the prior art, and specific embodiments such as double built presses, SMC presses and GMT presses are also encompassed by the invention. Preference is given to using spacers, known as stops, in the pressing procedure. These make it easier to set a desired degree of compaction of the core layer, but the invention is not restricted to such a procedure.

Preferred embodiments of the diaphragm of the invention have two covering layers which together with the core layer form a sandwich structure. The production of such diaphragms will now be described with the aid of the following figures.

Figure 2:
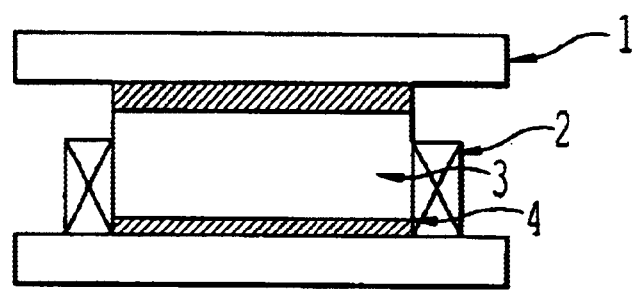

In the figures:

FIG. 1: the press when the covering layers and the core layer are introduced,

FIG. 2: heating to compaction temperature and closing to contact and

Figure 3:
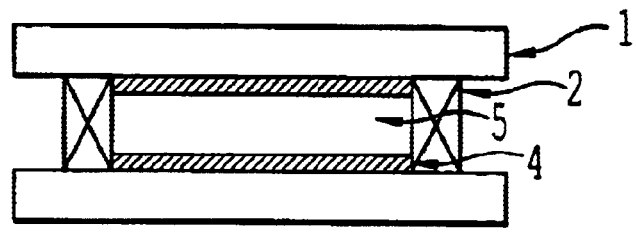

FIG. 3: closing of the press at compaction temperature.

FIGS. 1 to 3 schematically show the production of the diaphragm of the invention. Firstly, the core layer of poly(meth)acrylimide foam (3) together with the covering layers (4) located on both sides is placed in the press which has heatable and coolable platens (1) and stops (2). This procedure can be carried out at a temperature of <80° C., which corresponds approximately to the temperature at which the composite is taken out after the previous pressing cycle.

The press is subsequently closed to contact, which is shown in FIG. 2. At this time, the temperature of the press is increased to the compaction temperature. The compaction temperature is at least 160° C., preferably in a range of 165–230° C., very particularly preferably in a range of 175–180° C. If the temperature is less than 160° C. damage to the pore structure of the rigid poly(meth)acrylimide foam can occur.

As soon as this temperature has been reached, the press is closed to the stops, as shown in FIG. 3. The core layer is thus compacted to the intended degree of compaction. This is indicated by the reference number 5. The pressure required for this purpose is generally at least 0.4 MPa. However, depending on the temperature set, it is also possible to choose a higher pressure; the pressure is preferably in the range from 1 to 16 MPa. The residence time in the press is determined, inter alia, by the curing conditions for the resin or the adhesive. Before the finished composite can be taken from the press, the press has to be cooled at least to a temperature of <80° C., since otherwise the compacted cells would resume their original shape.

Furthermore, it is also possible to produce the composite of the invention via heating of the outer layers. Here, the temperature of the press is set directly to the compaction temperature, and the press compacts the core layer and simultaneously laminates the covering layers to the core layer at a pressure of >0.4 MPa, in particular 1–16 MPa. The press is preferably set to a pressure of about 70% of the compressive strength of the poly(meth)imide foam.

The further steps correspond to those described above.

In the process of the invention, the core layer is preferably compacted to a thickness less than 90%, preferably less than 80%, of the original thickness. If the compaction is less than this, the lamination does not adhere sufficiently in many cases without the use of particular adhesives. Compaction means that the pores of the core layer are made smaller. As a result, the strength of the diaphragm is considerably increased without its suitability for use as electroacoustic transducer being significantly impaired thereby.

The core layers relevant to the process of the invention comprise poly(meth)acrylimide foam.

The notation (meth)acryl... encompasses methacryl..., acryl and mixtures of the two.

Poly(meth)acrylimide foams for core layers of diaphragms comprise repeating units which can be represented by the formula (I),

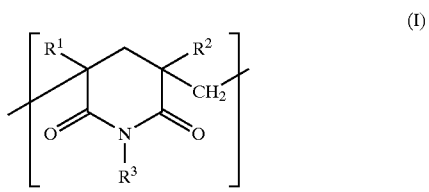

where $R^1$ and $R^2$ are identical or different and are each hydrogen or a methyl group and $R^3$ is hydrogen or an alkyl or aryl radical having up to 20 carbon atoms, with hydrogen being preferred.

Units of the structure (I) preferably make up more than 30% by weight, particularly preferably more than 50% by weight and very particularly preferably more than 80% by weight, of the poly(meth)acrylimide foam.

The production of rigid poly(meth)acrylimide foams which can be used according to the invention is known and is disclosed in, for example, GB-B 1 078 425 and 1 045 229, DE-C 1,817,156 (=U.S. Pat. No. 3,627,711) or DE-C 27 26 259 (=U.S. Pat. No. 4,139,685).

Thus, the units of the structural formula (I) can be formed, inter alia, from adjacent units of s(meth)acrylic acid and (meth)acrylonitrile by a cyclizing isomerization reaction on heating to from 150 to 250° C. (cf. DE-C 18 17 156, DE-C 28 26 259, EP-B 146 892). Usually, an intermediate is firstly produced by polymerization of the monomers in the presence of a free-radical initiator at low temperatures, e.g. from 30 to 60° C. with subsequent heating to from 60 to 120° C., and this is then foamed by heating to from about 180 to 250° C. in the presence of a blowing agent (cf. EP-B 356 714).

For example, a copolymer comprising (meth)acrylic acid and (meth)acrylonitrile, preferably in a molar ratio of from 2:3 and 3:2, can firstly be formed for this purpose.

In addition, these copolymers can further comprise additional comonomers, for example esters of acrylic or methacrylic acid, in particular with lower alcohols having 1–4 carbon atoms, styrene, maleic acid or its anhydride, itaconic acid or its anhydride, vinylpyrrolidone, vinyl chloride or vinylidene chloride. The proportion of comonomers which cannot be cyclized or can be cyclized only with great difficulty should not exceed 30% by weight, preferably 10% by weight.

In a likewise known manner, small amounts of crosslinkers, e.g. allyl acrylate, allyl methacrylate, ethylene glycol diacrylate or dimethacrylate, or polyvalent metal salts of acrylic or methacrylic acid, e.g. magnesium methacrylate, can advantageously be used as further monomers. The proportions can be, for example, from 0.005 to 5% by weight.

Furthermore, the intermediates may further comprise customary additives. These include, inter alia, antistatics, antioxidants, mold release agents, flame retardants, lubricants, dyes, flow improvers, fillers, light stabilizers and organic phosphorus compounds such as phosphites or phosphonates, pigments, weathering inhibitors and plasticizers.

Polymerization initiators employed are those customary for the polymerization of methacrylates, for example azo compounds such as azobisisobutyronitrile, and also peroxides such as dibenzoyl peroxide or dilauroyl peroxide, or else other peroxide compounds, e.g. t-butyl peroctanoate or perketals, as well as, if desired, redox initiators (cf., for example, H. Rauch-Puntigam, Th. Völker, Acryl- und Methacrylverbindungen, Springer, Heidelberg, 1967, or Kirk-Othmer, Encyclopedia of Chemical Technology, Vol. 1, pages 286 ff, John Wiley & Sons, New York, 1978). The polymerization initiators are preferably used in amounts of from 0.01 to 0.3% by weight, based on the starting materials. It can also be useful to combine polymerization initiators having different decomposition properties in terms of time and temperature. For example, the simultaneous use of tert-butyl perpivalate, tert-butyl perbenzoate and tert-butyl per-2-ethylhexanoate is advantageous.

Foaming of the copolymer during conversion into a polymer containing imide groups is achieved in a known manner by use of blowing agents which form a gas phase at from 150 to 250° C. by decomposition or vaporization. Blowing agents having an amide structure, e.g. urea, monomethyl urea or N,N'-dimethylurea, formamide or monomethyl formamide, decompose with liberation of ammonia or amines which can contribute to additional formation of imide groups. However, it is also possible to use nitrogen-free blowing agents such as formic acid, water or monohydric aliphatic alcohols having from 3 to 8 carbon atoms, e.g. propanol, butanol, isobutanol, pentanols or hexanols. Blowing agents are usually used in the reaction mixture in amounts of about 0.5 to 8% by weight, based on the monomers used.

A very particularly preferred polymethacrylimide foam which can be used can be obtained, for example, by means of the following steps:

1. Production of a polymer sheet by free-radical polymerization in the presence of one or more initiators and, if desired, further customary additives as mentioned above by way of example, comprising
   (a) a monomer mixture of 40–60% by weight of methacrylonitrile, 60–40% by weight of methacrylic acid and, if desired, up to 20% by weight, based on the sum of methacrylic acid and methacrylonitrile, of further monofunctional, vinylically unsaturated monomers,
   (b) 0.5–8% by weight of a blowing agent mixture comprising formamide or monomethylformamide and a monohydric aliphatic alcohol having 3–8 carbon atoms in the molecule,
   (c) a crosslinker system comprising
      (c.1) 0.005–5% by weight of a free-radically polymerizable vinylically unsaturated compound having at least 2 double bonds in the molecule and
      (c.2) 1–5% by weight of magnesium oxide dissolved in the monomer mixture.
2. Foaming of the sheet at temperatures of from 200 to 260° C. to give a polymethacrylimide sheet, and subsequent
3. heat treatment in two steps, with the first step being at 100–130° C. for 2–6 hours and the second step being at 180–220° C. for 32–64 hours.

Polymethacrylimides having a high heat distortion resistance can also be obtained by reacting polymethyl methacrylate or its copolymers with primary amines, which can likewise be used according to the invention. Representatives of the many examples of this polymer- analogous imidation are: U.S. Pat. No. 4 246 374, EP 216 505 A2, EP 860 821. High heat distortion resistance can here be achieved either by use of arylamines (JP 05222119 A2) or by the use of specific comonomers (EP 561 230 A2, EP 577 002 A1). However, all these reactions do not give foams but solid polymers which have to be foamed in a separate, second step to obtain a foam. Techniques for this are also known from the prior art.

Rigid poly(meth)acrylimide foams can also be obtained commercially, for example ®Rohacell from Röhm GmbH, which can be supplied in various densities and sizes.

The density of the poly(meth)acrylimide foam before compaction is preferably in the range from 20 kg/m$^3$ to 180 kg/m$^3$, particularly preferably in the range from 50 to 110 kg/m$^3$.

The core layer may further comprise additional layers. Prior to compaction, the thickness of the core layer is in the range from 1 to 100 mm, in particular in the range from 5 to 40 mm and very particularly preferably in the range from 10 to 30 mm.

As covering layer it is possible to use any known sheet-like body which is stable at the processing parameters, e.g. pressure and temperature, necessary for producing the diaphragm. These include, for example, films made of polypropylene, polyester, polyamide, polyurethane, polyvinyl chloride, polymethyl (meth)acrylate, and/or metal such as aluminum. It may also be advantageous to use mats or sheets comprising glass fibers, carbon fibers and/or aramid fibers. Sheets having a multilayer structure can also be used as covering layer.

It may be advantageous to use, for example, prepregs. These are the sheets, usually glass fiber mats or woven glass filament fabrics, which have been preimpregnated with curable resins and can be processed by hot pressing to give moldings or semifinished parts. These include, inter alia, a GMT and SMC.

Furthermore, carbon fiber-reinforced plastics which are particularly useful as covering layers are also known.

The thickness of the covering layer is preferably in the range from 0.05 to 10 mm, preferably in the range from 0.1 to 5 mm and very particularly preferably in the range from 0.5 to 2 mm.

To improve the adhesion, it is also possible to use an adhesive. However, depending on the material of the covering layer, this may not be necessary.

The diaphragm produced by the process of the invention have excellent mechanical properties. Thus, for example, the peel strength in accordance with DIN 53295 is 10 Nmm/mm or more, preferably more than 15 Nmm/mm. The modulus of elasticity in accordance with DIN 53 423 is greater than or equal to 50 MPa, in particular greater than 60 MPa.

Furthermore, the flexural strength in accordance with DIN 53423 is also surprisingly high, being 2 MPa or more, in particular greater than 2.3 MPa. The flexural stiffness in accordance with DIN 53 293, too, is 8 MPa or more, in particular greater than 10 MPa.

Example 1

Cytec GFK/EP prepreg layers (Cycom 69) are placed on the upper surface and underside of a polymethacrylimide foam (®ROHACELL 51) having the dimensions 300×300× 26 mm. This packet is placed in a heatable press. The press is subsequently closed to contact and heated to 180° C. The press is then closed to 20mm, using thickness stops. The press is then cooled to a temperature of 80° C. and the finished diaphragm is taken out. The peeling test in accordance with DIN 53 295 gives a value of 18 Nmm/mm.

Comparative Example 1

This example is carried out like example 1 except that the core layer is not compacted, i.e. the press is not closed to 20 mm. The peeling test in accordance with DIN 53 295 gives a value of 6 Nmm/mm.

The high peel strength is particularly important for flat-diaphragm loudspeakers, also referred to as DMLs (=distributed mode loudspeakers), since in this loudspeaker principle the membrane vibrates within itself to produce sound.

What is claimed is:

1. A process for producing a diaphragm for electroacoustic transducers, wherein said diaphragm comprises a core layer and at least one covering layer, and said core layer comprises poly(meth)acrylimide foam, said process comprising:
laminating said covering layer with said core layer comprising the poly(meth)acrylimide foam at a pressure greater than 0.4 MPa and a temperature greater than 160° C.,
while compacting at least one side of said core layer comprising the poly(meth)acrylimide foam in contact with said covering layer to form a resulting composite,
then cooling said resulting composite to a temperature below 80° C.,
then reducing the pressure to ambient pressure.

2. The process as claimed in claim 1, wherein the at least one side of the core layer in contact with the covering layer is heated to a temperature from 165 to 230° C.

3. The process as claimed in claim 2, wherein the laminating is carried out using a pressure in the range from 1 to 16 MPa.

4. The process as claimed in claim 2, wherein the core layer is compacted to a thickness of less than 90% of an original thickness.

5. The process as claimed in claim 2, wherein the covering layer is a sheet-like body comprising a component selected from the group consisting of carbon fibers, glass fibers, aramid fibers, polypropylene, polyester, polyamide, polyurethane, polymethyl (meth)acrylate, polyvinyl chloride, metal and combinations thereof.

6. The process as claimed in claim 2, wherein two covering layers are used to form a sandwich structure.

7. The process as claimed in claim 1, wherein the at least one side of the core layer in contact with the covering layer is heated to a temperature from 175 to 180° C.

* * * * *